UNITED STATES PATENT OFFICE.

BRADLEY L. PRIME, OF HAMILTON, OHIO.

IMPROVEMENT IN CEMENT COMPOSITIONS FOR ROOFING.

Specification forming part of Letters Patent No. 19,712, dated March 23, 1858.

*To all whom it may concern:*

Be it known that I, BRADLEY L. PRIME, of Hamilton, in the county of Butler and State of Ohio, have invented a new and useful Improvement in Roofing Composition; and I do hereby declare that the following is a full, clear, and exact description of the same, together with the mode of preparing and using it.

The composition is made up of the following ingredients, in substantially the proportions stated: Coal-tar, one and one-half gallon; vegetable tar, one-half pound; brimstone, twelve ounces; asphaltum, six ounces; india-rubber, one and one-half pound; gutta-percha, one ounce; gum copal, two ounces; red oxide of lead, eight ounces; red lead, eight ounces; umber, eight ounces; Spanish whiting, sixteen ounces; hydraulic cement, four ounces; Japan varnish, one-half pint. The india-rubber is to be dissolved in camphene, and linseed-oil used as a solvent for the gutta-percha.

The composition is prepared as follows: The coal-tar is heated to about 150° Fahrenheit, and the oxide of lead, red lead, umber, whiting, cement, rubber, and gutta-percha stirred therein. The vegetable tar, previously melted with the sulphur, asphaltum, and gum-copal, is then added, and the mass well stirred until the ingredients are thoroughly incorporated. It is then allowed to cool, when it is ready for use, and can be applied with a brush.

To use this composition the roof is covered with canvas, paper, felt, or any suitable material. After applying the first coat the roof is sprinkled with sand while the composition is in a soft state. The first coat is then left to harden for about a week. Another coat is applied and covered with sand or smalt, as before. When this coat dries the operation is complete, the sand becoming incorporated with the composition, and the whole becomes completely indurated.

This composition, when used, should always be cold. It can be applied at any reasonable time after manufacture, and can thus become an article of commerce.

The functions designed to be filled by the several ingredients are as follows: Coal-tar and vegetable tar, to serve as a durable body with which to incorporate the other parts of the composition; sulphur, designed as a hardener and drier of the composition. It is not affected by heat or cold, and when incorporated with the other parts acts to prevent atmospheric influence. It is, moreover, water-proof. Asphaltum, to harden the tar. It makes it thicker and much stronger. India-rubber and gutta-percha, for giving elasticity to the mass. Gum-copal toughens the composition and acts to resist atmospheric influence; red oxide of lead and red lead, to harden and dry the composition; umber, to dry and harden and prevent the flow of the composition. For this last purpose it is superior to beeswax, and, being a mineral substance, is less liable to be acted upon by the atmosphere than beeswax. Its hardening properties do not tend to negative the elasticity imparted to the composition by other ingredients. Spanish whiting, to render the mass tough and hard. It is water-proof. Hydraulic cement. This is a useful ingredient of the composition. It acts as a hardener, and, used in the proportion above named, it is so toughened by the gum-copal and other vegetable ingredients that it looses its strong nature, its hardening and water-proof properties being rendered available in the composition without rendering it brittle. Japan varnish—a drier—also gives the composition a glossy surface, and acts to prevent the flow while it is being spread upon the cloth or paper. The ordinary Japan varnish of commerce is employed.

This composition forms a cheap and durable covering for roofs and other analogous purposes. The large preponderance of mineral substances is a voucher for its durability.

I am aware that some of the ingredients used by me have been employed for analogous purposes in various proportions and in combination with various other substances. Therefore I do not claim broadly the employment of such substances in roofing composition; but What I do claim is—

The combination of the substances hereinbefore described, in substantially the proportions set forth, for the manufacture of roofing composition.

In testimony whereof I have hereunto signed my name before two subscribing witnesses.

BRADLEY L. PRIME.

Witnesses:
ISRAEL WILLIAMS,
S. CRANE.